No. 753,079. PATENTED FEB. 23, 1904.
W. C. KEYWORTH.
WARPING AND BEAMING MACHINE.
APPLICATION FILED MAY 1, 1903.
NO MODEL. 3 SHEETS—SHEET 3.
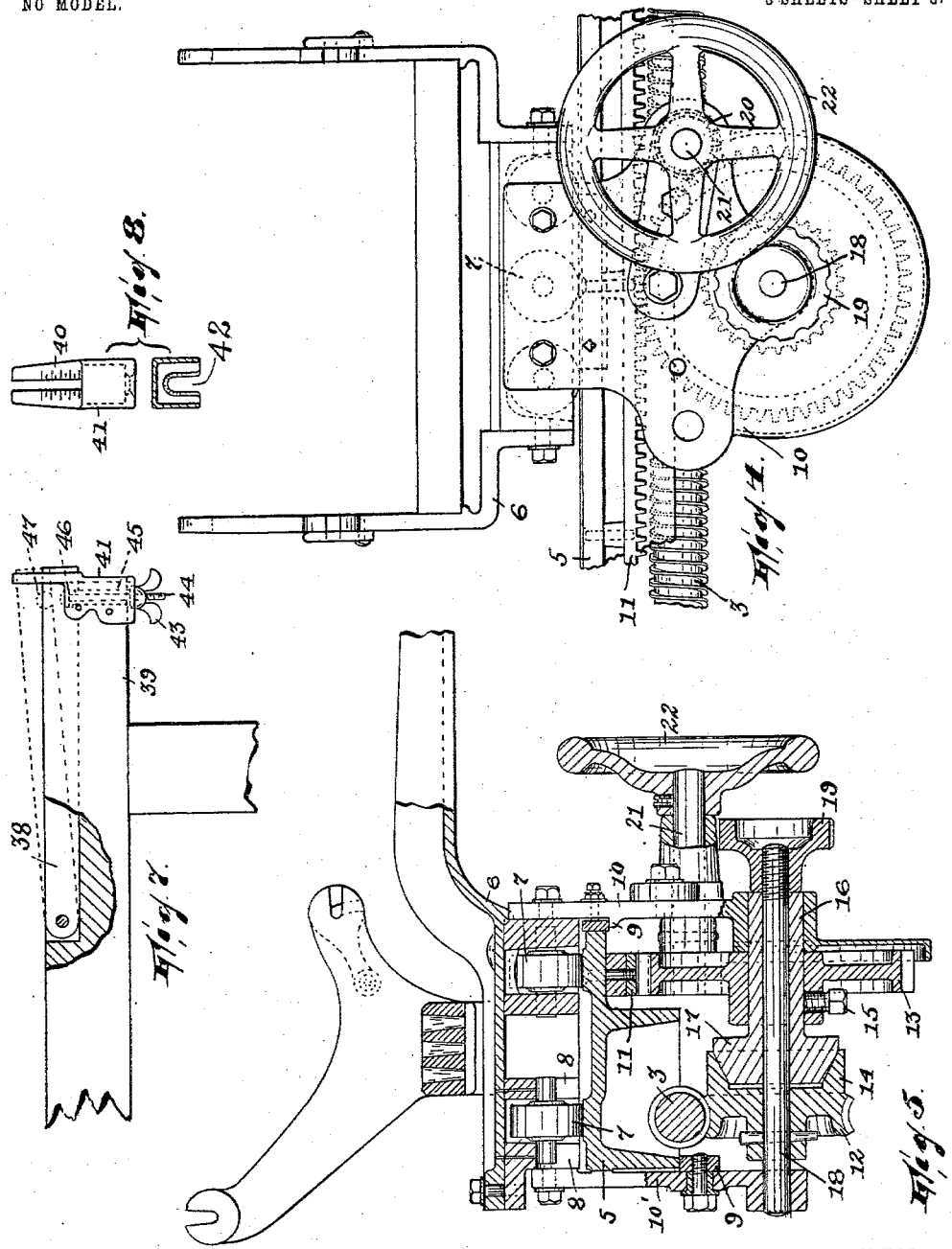
WITNESSES: INVENTOR,
William C. Keyworth,
BY
Gartner Steward
ATTORNEYS No. 753,079. Patented February 23, 1904.

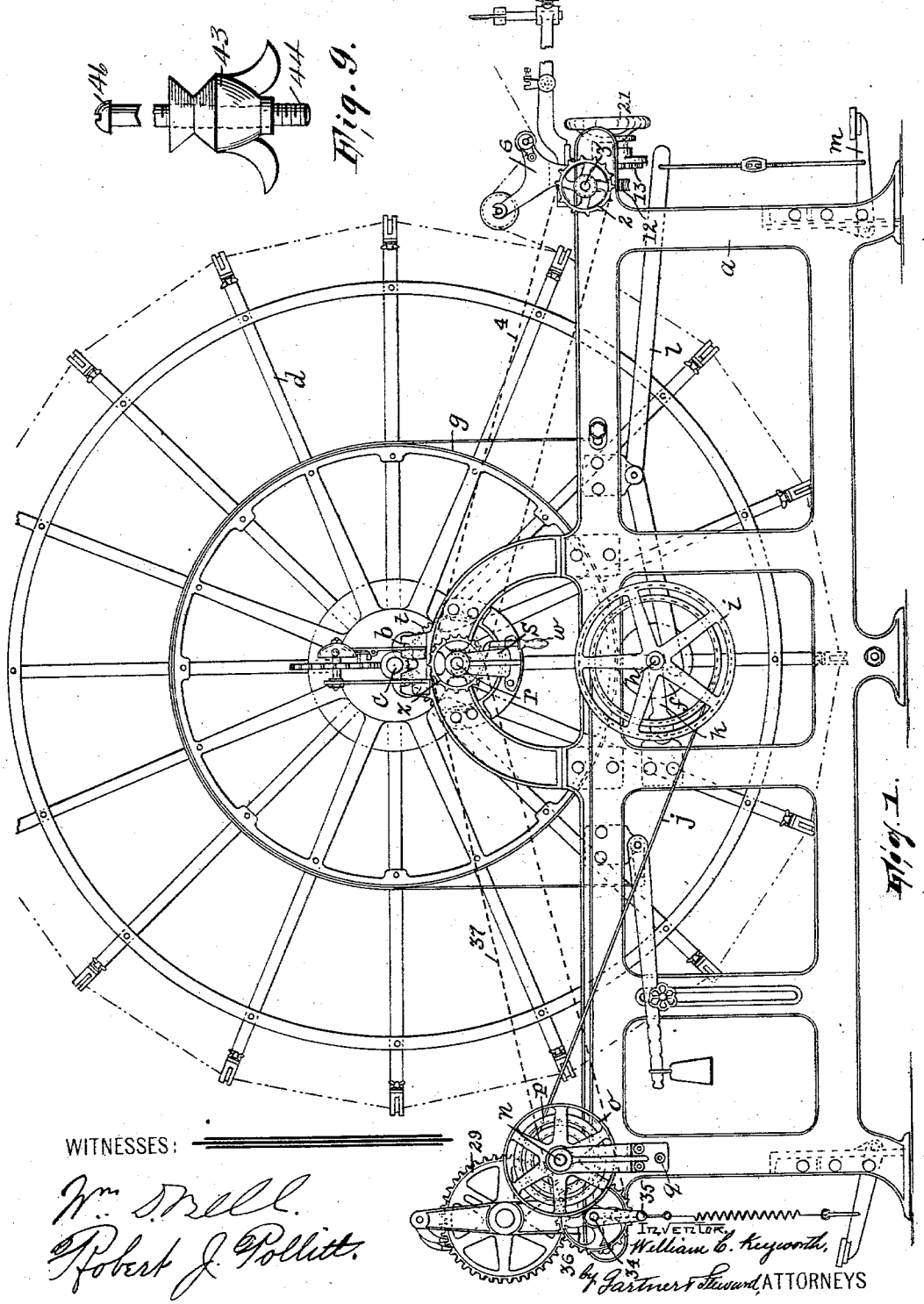

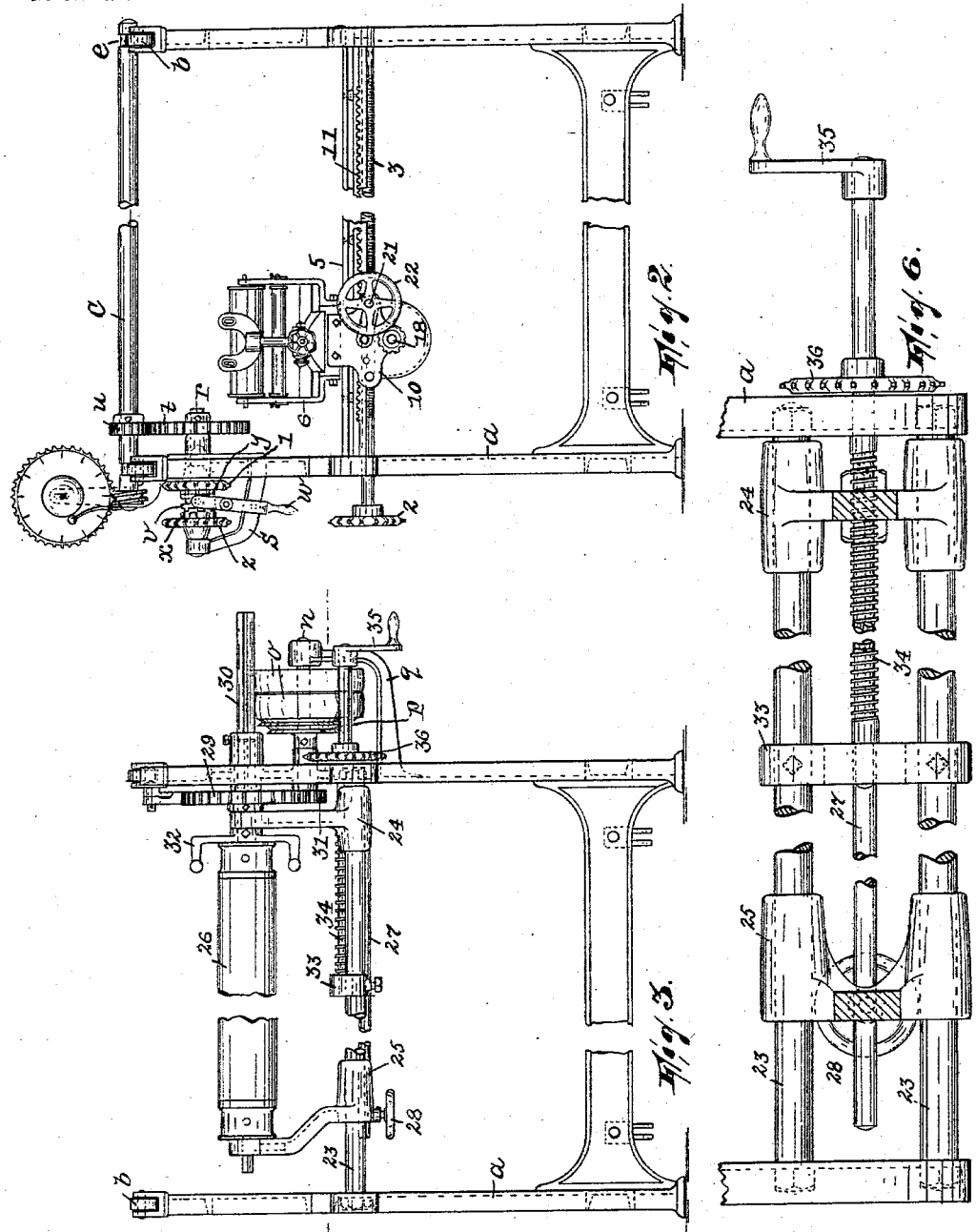

UNITED STATES PATENT OFFICE.

WILLIAM C. KEYWORTH, OF PATERSON, NEW JERSEY, ASSIGNOR TO THE BENJAMIN EASTWOOD COMPANY, OF PATERSON, NEW JERSEY, A CORPORATION OF NEW JERSEY.

WARPING AND BEAMING MACHINE.

SPECIFICATION forming part of Letters Patent No. 753,079, dated February 23, 1904.

Application filed May 1, 1903. Serial No. 155,152. (No model.)

*To all whom it may concern:*

Be it known that I, WILLIAM C. KEYWORTH, a citizen of the United States, residing in Paterson, in the county of Passaic and State of New Jersey, have invented certain new and useful Improvements in Warping and Beaming Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My invention relates to the operations of warping and beaming; and it consists in certain improvements in machines for effecting these operations looking principally toward increasing the accuracy or nicety with which the warps are manipulated in laying them on the reel and removing them from the reel to the beam.

The invention will be found fully illustrated in the accompanying drawings, wherein—

Figure 1 is a view in side elevation of my improved machine. Fig. 2 is a view in elevation looking toward what is commonly known as the "warping" end of the machine. Fig. 3 is a view in elevation looking toward what is known as the "beaming" end. Figs. 4 and 5 are views showing in front elevation and vertical section certain details of the warping mechanism. Fig. 6 is a horizontal sectional view showing a portion of the beaming mechanism, and Figs. 7, 8, and 9 are detail views illustrating an improved adjusting mechanism for the equalizer-bars of the reel.

In the frame $a$ of the machine in roller-bearings $b$ is journaled the shaft $c$ of the reel $d$. Where the rollers $b$ engage the shaft the latter is annularly channeled, as at $e$, in a width corresponding to the width of the rollers, so that thus the shaft is prevented from longitudinal movement and the reel kept perfectly true. The reel is driven, as usual, by a roller $f$, which takes against the rim $g$ of the reel and which is fast on the same shaft $h$ with pulleys $i$, around one of which passes a crossed driving-belt $j$, shaft $h$ being journaled in a pivoted arm $k$. The roller $f$ is moved into or out of contact with rim $g$ by a lever $l$, controlled from a treadle $m$ in the usual manner.

$n$ designates the main drive-shaft, the same carrying the usual fast and loose pulleys $o$ and pulleys $p$, around one of which belt $j$ extends, and being journaled in the frame $a$ and a bracket $q$, projecting therefrom.

$r$ designates a shaft which is journaled near one end of shaft $c$ in the frame $a$ and a bracket $s$. This shaft $r$ carries a gear $t$, which meshes with a pinion $u$ on the shaft $c$, and on said shaft $r$ is splined a clutch member $v$, controlled by a fork $w$, fulcrumed in bracket $s$. According as clutch member $v$ is shifted toward the one or the other end of the shaft so it is made to engage either the one or the other of clutch members $x\,y$, respectively, integral with sprockets $z$ 1, so to cause the motion of the shaft to be transmitted to either of said sprockets.

Sprocket $z$ is connected with another sprocket 2, fast on a rotary screw 3, journaled in the warping end of the frame $a$ by a sprocket-chain 4. Over the screw is arranged a rail 5, on which the reed-carriage 6 moves, said carriage being supported by antifriction-rollers 7, which bear on the top of the rail and whose trunnions take in opposed recesses 8 in the carriage. The carriage is prevented from upward displacement by abutments 9 on aprons 10 10' of the carriage, said abutments taking against underneath surfaces of the rail. Against the under surface of the rail is secured a longitudinal rack 11. With the screw 3 engages a worm-wheel 12, while with the rack engages a gear 13. Worm-wheel 12 forms a part of a clutch member 14, while gear 13 is secured fast by a set-screw 15 on the sleeve portion 16 of a clutch member 17, said clutch members being formed the one with a conical projection and the other with an opposed conical recess and arranged on a spindle 18. Spindle 18 is journaled at its rear end in the apron 10', while the sleeve 16 is journaled in the apron 10. The front end of the spindle is threaded and carries a nut 19, whereby the clutch members, and consequently the worm-wheel and gear, may be rendered relatively fast or loose. It will be observed that the apron 10 is formed as a guard for the gear 13. With gear 13 engages a pinion 20 on a spindle 21, which is journaled in the apron 10 and carries a hand-wheel 22.

The mechanism immediately above described affords a very accurate and easily-manipulated means for adjusting the reed-carriage from one point to another with reference to the screw. When nut 19 secures the clutch members fast, the rotation of screw 3 is transmitted through said members to gear 13, which then coacts with rack 11 to move the carriage; but if nut 19 is loosened the clutch members are released, so that the action of the screw is not transmitted to gear 13. The reed-carriage will thus stand still, except, however, it be desired to move it by hand, whereupon hand-wheel 22 is turned, acting through pinion 20, gear 13, and the rack to move the reed-carriage to any desired position.

At the beaming end of the machine is arranged the usual pair of guide-rods 23. On these as a guideway slide the usual pair of stands or puppets 24 25, which support the beam 26. These stands are connected by a reach-rod 27, which is bolted in the stand 24 and penetrates the stand 25, between which and said rod an adjustable relation is maintained by a hand-screw 28, arranged in said stand and taking against the rod. In the frame $a$ is journaled a gear 29, through which extends the tail-shaft 30, to which said gear is splined, said gear being driven from a pinion 31 on shaft $n$. The stand 24 forms a partial support for the tail-shaft 30, the inner end of which, it should be remarked, carries the clutch 32, which directly receives one of the trunnions of the beam and to which the beam is secured in the usual manner, so as to be rotated thereby.

The guide-rods 23 are connected by a bridge-piece 33, in which and the frame $a$ is journaled a screw 34, which penetrates and whose threading engages the stand 24, and which carries both a handle 35 for manually rotating it and a sprocket 36, which is connected with the sprocket $y$ by a sprocket-chain 37.

In the mechanism shown in Figs. 7 and 8 for adjusting the pivoted equalizer-bars of the reel, 38 designates one of said equalizer-bars arranged in the corresponding cross-piece 39 of the reel and having its free end movable between the parallel integral guides 40 (which are marked to serve as gages) of a casting 41, which fits over and is secured to the end of the cross-piece. In a slot 42, formed in the under side of the casting, is swiveled a nut 43, engaging the threading of a screw 44, which penetrates a hole 45 in the cross-piece, and has its head 46 fitted into a spherical socket 47 in the equalizer-bar. The head of the screw fits snugly enough in the socket, so that while it affords therewith a ball-and-socket joint it will not turn so readily as the nut turns on the screw. Thus on turning the nut it will be apparent that the screw will be moved longitudinally, so as to adjust the equalizer-bar, and this adjustment may be regulated with reference to the gages which guides 40 form.

In warping, power being taken into the machine at the pulleys $o$, and clutch member $v$ being shifted to engage clutch member $x$, the rotation of the reel from pulleys $p$ through belt $j$, pulley $i$, roller $f$, and band $g$ will through sprocket $z$, chain 4, sprocket 2, screw 3, and the parts which operatively connect said screw with the carriage (when the same are adjusted so as to effect the traverse of the carriage) cause the carriage to move in a regular and easy manner transversely of the machine, so as to lay the warp evenly and uniformly on the reel. As fast as the desired length of each section is run off nut 19 is manipulated, so as to permit the carriage to be shifted by hand by manually rotating hand-wheel 22 to the desired new position for the reel, as will be understood.

In beaming, the beam being first mounted in operative position in the tail-shaft 30 and stand 25, (which latter is afterward fixed relatively to stand 24 by means of the hand-screw 28 and reach-rod 27,) the beam is then adjusted to the proper position relatively to the reel by rotating screw 34 by means of its handle 35, stands 24 and 25 being thus caused to move as one. It should be remarked that the manual rotation of screw 34 is possible, because clutch member $v$ has not at this time been shifted into engagement with clutch member $y$ of sprocket 1. When the adjustment of the beam has been accomplished, however, clutch member $v$ is shifted into engagement with clutch member $y$, whereupon the drive from pulleys $o$ not only acts through shaft $n$, pinion 31, gear 29, and tail-shaft 30 to drive the beam, but from the reel $d$ (caused to rotate by the warp as the beam draws upon it) and through shaft $c$, pinion $u$, gear $t$, shaft $r$, clutch member $v$, sprocket 1, with which said clutch member is now fast, sprocket-chain 37, sprocket 36, and screw 34 acts to cause the beam to automatically advance laterally, so that the warps are laid on the beam in the same even manner that they were laid on the reel.

The advantage of the clutch mechanism controlled by fork $w$ is that said mechanism renders it absolutely impossible for the operator to inadvertently permit both screws 3 and 34 to work at the same time.

Having thus fully described my invention, what I claim as new, and desire to secure by Letters Patent, is—

1. The combination of the frame, the reel journaled therein, a traversing reed-carriage, a traversing beam-supporting means, an actuating means from which the power for traversing both the beam-supporting means and the reed-carriage is derivable, power-transmitting mechanism operatively connected to said reed-carriage, power-transmitting mechanism operatively connected to said beam-supporting means, and means for throwing one of said power-transmitting mechanisms into, and the other of said power-transmitting mechanisms out of, operative engagement with the actuating means, substantially as described.

2. The combination of the frame, the reel journaled therein, a traversing reed-carriage, a traversing beam-supporting means, a rotary shaft from which the power for traversing both the beam-supporting means and the reed-carriage is derivable, power-transmitting mechanism operatively connected to said reed-carriage, power-transmitting mechanism operatively connected to said beam-supporting means, and means for throwing one of said power-transmitting mechanisms into, and the other of said power-transmitting mechanisms out of, operative engagement with said shaft, substantially as described.

3. The combination of the frame, the reel journaled therein, a traversing reed-carriage, a traversing beam-supporting means, a rotary shaft from which the power for traversing both the beam-supporting means and the reed-carriage is derivable, power-transmitting mechanism operatively connected to said reed-carriage, power-transmitting mechanism operatively connected to said beam-supporting means, and a clutch member revoluble with but movable longitudinally of said shaft and operatively engageable with either of said mechanisms to transmit thereto power from the shaft, substantially as described.

4. The combination of the frame, the reel journaled therein, a traversing reed-carriage, a traversing beam-supporting means, a rotary shaft from which the power for traversing both the beam-supporting means and the reed-carriage is derivable, power-transmitting mechanism operatively connected to said reed-carriage comprising a part arranged to rotate on said shaft, power-transmitting mechanism operatively connected to said beam-supporting means and also comprising a part arranged to rotate on said shaft, and a clutch member rotatable with but movable lengthwise of said shaft, said clutch member being shiftable into engagement with either of said rotary parts to transmit thereto power from the shaft, substantially as described.

5. In a beaming mechanism, the combination of the frame, the beam, a guideway arranged in said frame, stands or puppets arranged to slide on said guideway and constituting a partial support for the beam, a reach-rod carried by one of said stands, and means for adjustably securing the other stand to said reach-rod, substantially as described.

6. In a beaming mechanism, the combination of the frame, the beam, beam-driving means, guide-rods arranged in said frame, stands or puppets arranged to slide on said guide-rods and constituting a supporting means for the beam and its immediate driving means, a reach-rod carried by one of said stands, and means for adjustably securing the other stand to said reach-rod, substantially as described.

7. In a beaming mechanism, the combination of the frame, the beam, guide-rods arranged in said frame, stands or puppets arranged to slide on said guide-rods and constituting a supporting means for the beam and its immediate driving means, means for securing said stands against movement relatively to each other, and a screw journaled in said frame and having a threaded engagement with one of said stands, substantially as described.

8. In a beaming mechanism, the combination of a frame, the beam, beam-supporting means, a guideway for said beam-supporting means, a rotary screw operatively connecting said frame and the beam-supporting means and adapted to effect the traverse of the latter, an actuating means for the screw, and disconnective connecting means between the actuating means and the screw, substantially as described.

9. In a warping-machine, the combination of the frame comprising a rail, a traversing reed-carriage bearing against the top of said rail, said carriage having depending portions disposed both sides of, and extending below, said rail, a rack and a rotary screw arranged under and parallel with said rail, a worm-wheel and a gear respectively engaging the screw and the rack and arranged under the same, and means for rendering said gear and worm-wheel fast or loose relatively to each other, the group of parts comprising the worm-wheel, the gear and the means for rendering said gear and worm-wheel fast or loose relatively to each other having support in both said depending portions of the carriage and being also disposed under said rail, substantially as described.

10. The combination, with a cross-bar of a warping-machine reel, of an adjustable equalizer-bar arranged in said cross-bar, a swiveled part, and a longitudinally-movable part having a threaded engagement with said swiveled part and also engaging said equalizer-bar, substantially as described.

11. The combination, with a cross-bar of a warping-machine reel, of an adjustable equalizer-bar arranged in said cross-bar, a casting arranged on said equalizer-bar, a swiveled part arranged in said casting, and a longitudinally-movable part having a threaded engagement with said swiveled part and engaging said equalizer-bar, substantially as described.

In testimony that I claim the foregoing I have hereunto set my hand this 30th day of April, 1903.

WM. C. KEYWORTH.

Witnesses:
JOHN W. STEWARD,
JAMES B. NEWTON.